(12) United States Patent
Hu et al.

(10) Patent No.: US 12,038,679 B2
(45) Date of Patent: Jul. 16, 2024

(54) WAVELENGTH CONVERSION APPARATUS, LIGHT SOURCE SYSTEM AND DISPLAY DEVICE

(71) Applicant: APPOTRONICS CORPORATION LIMITED, Guangdong (CN)

(72) Inventors: Fei Hu, Guangdong (CN); Xin Yu, Guangdong (CN); Shijie Li, Guangdong (CN); Yi Li, Guangdong (CN)

(73) Assignee: APPOTRONICS CORPORATION LIMITED, Guangdong (CN)

( * ) Notice: Subject to any disclaimer, the term of this patent is extended or adjusted under 35 U.S.C. 154(b) by 259 days.

(21) Appl. No.: 17/428,957

(22) PCT Filed: Mar. 18, 2020

(86) PCT No.: PCT/CN2020/079851
§ 371 (c)(1),
(2) Date: Aug. 5, 2021

(87) PCT Pub. No.: WO2020/211587
PCT Pub. Date: Oct. 22, 2020

(65) Prior Publication Data
US 2022/0128894 A1   Apr. 28, 2022

(30) Foreign Application Priority Data
Apr. 15, 2019 (CN) .......................... 201910300500.X (51) Int. Cl.
*G03B 21/20* (2006.01)
*G02B 26/00* (2006.01)
(Continued)

(52) U.S. Cl.
CPC ......... *G03B 21/204* (2013.01); *G02B 26/008* (2013.01); *H04N 9/3111* (2013.01);
(Continued)

(58) Field of Classification Search
CPC .. G03B 21/204; G03B 21/006; G02B 26/008; H04N 9/3111; H04N 9/3155; H04N 9/3161; H04N 9/3164
See application file for complete search history.

(56) References Cited

U.S. PATENT DOCUMENTS

2007/0230179 A1   10/2007   Ripoll et al.
2014/0293576 A1   10/2014   Chou et al.
(Continued)

FOREIGN PATENT DOCUMENTS

CN   101055407 A   10/2007
CN   205539893 U   8/2016
(Continued)

OTHER PUBLICATIONS

ISA China National Intellectual Property Administration, International Search Report Issued in Application No. PCT/CN2020/079851, Jun. 19, 2020, WIPO, 5 pages.

*Primary Examiner* — Yassin Alata
(74) *Attorney, Agent, or Firm* — McCoy Russell LLP (57) ABSTRACT

Provided are a wavelength conversion apparatus, a light source system including the same, and a display device including the light source system. The wavelength conversion apparatus includes an angle deflection region and a wavelength conversion region for converting incident second light into excited light and then emitting same. The angle deflection region includes deflection units, each of which includes a light emergent face for emitting first light. A first included angle is formed between the light emergent face and a reference plane. First included angles between light emergent faces of at least two deflection units and the reference plane are not equal. The deflection units are located on a light path of the first light in a time sequence, so as to change an emergent angle of the first light in the time (Continued)

sequence, such that the first light is successively scanned at a preset position to form virtual pixels.

16 Claims, 12 Drawing Sheets

(51) Int. Cl.
*H04N 9/31* (2006.01)
*G03B 21/00* (2006.01)

(52) U.S. Cl.
CPC ......... *H04N 9/3155* (2013.01); *H04N 9/3161* (2013.01); *H04N 9/3164* (2013.01); *G03B 21/006* (2013.01)

(56) References Cited

U.S. PATENT DOCUMENTS

2018/0033357 A1\* 2/2018 Li ........................... G09G 3/007
2018/0172978 A1\* 6/2018 Hu ....................... G03B 21/204

FOREIGN PATENT DOCUMENTS

| CN | 109491187 A | 3/2019 |
| JP | 2013061525 A | 4/2013 |

\* cited by examiner

WAVELENGTH CONVERSION APPARATUS, LIGHT SOURCE SYSTEM AND DISPLAY DEVICE

CROSS REFERENCE TO RELATED APPLICATIONS

The present application is a U.S. National Phase of International Application No. PCT/CN2020/079851 entitled "WAVELENGTH CONVERSION APPARATUS, LIGHT SOURCE SYSTEM AND DISPLAY DEVICE," and filed on Mar. 18, 2020. International Application No. PCT/CN2020/079851 claims priority to Chinese Patent Application No. 201910300500.X filed on Apr. 15, 2019. The entire contents of each of the above-listed applications are hereby incorporated by reference for all purposes.

TECHNICAL FIELD

The present disclosure relates to the field of display technology, and to a wavelength conversion apparatus, a light source system and a display device.

BACKGROUND AND SUMMARY

Conventional laser fluorescent projection systems typically utilizes a laser to excite a fluorescent region on a wavelength conversion apparatus to generate fluorescent light, and usually utilizes a blue laser for the excitation. The wavelength conversion apparatus is generally provided with a red fluorescent region, a green fluorescent region and a transmission region allowing the blue laser to transmit therethrough. The generated red fluorescent light, green fluorescent light and transmitted blue light are modulated by a light modulation device to obtain an image with a light-and-dark pattern. A light source array on the light modulation device controls a gray scale of each pixel of a display image, and images obtained by modulating the light of the three colors are superimposed to obtain the display image.

However, the light modulation device has an upper-limit light power which would limit brightness of the display image. If the display screen requires a higher brightness, the projection system must employ a larger light modulation device to reduce a power density. In this way, a volume of the projection system would be increased, which is not desired for the development of miniaturization and lightness of a display device, and would also greatly increase manufacturing cost of the projection system.

According to a first aspect of the present disclosure, a wavelength conversion apparatus is provided. The wavelength conversion apparatus includes an angle deflection region and a wavelength conversion region. The angle deflection region includes a plurality of deflection units, each of which includes a light-emitting surface for emitting a first light. A first included angle is formed between the light-emitting surface and a reference plane. First included angles formed between the reference plane and the light-emitting surfaces of at least two of the plurality of deflection units are not equal to each other. The plurality of deflection units are located on an optical path of the first light in time sequence in order to change an emergent angle of the first light in time sequence in such a manner that the first light is successively scanned at a preset position to form a plurality of virtual pixels. The wavelength conversion region is configured to convert a second light incident to the wavelength conversion region into an excited light and emit the excited light.

According to a second aspect of the present disclosure, a light source system is provided. The light source system includes the wavelength conversion apparatus as described above, a first light source configured to emit laser light as the first light, and a second light source configured to emit the second light.

According to a third aspect of the present disclosure, a display device is provided. The display device is configured to emit image light to a projection imaging plane based on original image data of each frame of images to be displayed to form a display image, and the images to be displayed includes a plurality of pixel units. The display device includes a control device configured to transmit a light modulation signal based on the images to be displayed, the light source system as described above, and a light modulation device. The light modulation device is configured to modulate the excited light based on the light modulation signal and then emit the modulated light to form a modulated image. The modulated image is superimposed with a scanned image, and then is emitted from the display device onto the projection imaging plane, where the scanned image is formed by the first light passing through the angle deflection region, and each of the plurality of virtual pixels of the scanned image covers a plurality of projection pixels.

The wavelength conversion apparatus and the light source system according to the present disclosure, on the one hand, use the angle deflection region to adjust the emergent direction of the emitted light to form the scanned image, and on the other hand, use the wavelength conversion region to generate the excited light to be applied to the display of the color image. The display device according to the present disclosure is configured to superimpose the scanned image and the modulated image obtained by modulating the excited light through the light modulation device, which is beneficial to improve the display brightness of the display device without increasing the resolution of the light modulation device, and is beneficial to avoid the volume and cost of display device from being increased due to increased resolution of the light modulation device.

BRIEF DESCRIPTION OF THE FIGURES

In order to more clearly describe technical solutions of the embodiments/implementations of the present disclosure, accompanying drawings described in the description of the embodiments/implementations will be briefly introduced hereinafter. It is apparent that the accompanying drawings in the following description are some embodiments/implementations of the present disclosure. Other drawings may be obtained based on these drawings by those skilled in the art without any creative efforts.

REFERENCE SIGN LIST

| | |
|---|---|
| Display device | 10, 20, 30, 40 |
| Light source system | 100 |
| Light modulation device | 160, 260, 360, 460 |
| Control device | 150, 340 |
| First light source | 111 |
| Second light source | 112 |
| Wavelength conversion apparatus | 120 |
| Wavelength conversion region | 121 |
| Red fluorescent region | R |
| Green fluorescent region | G |
| Scattering region | B |
| Angle deflection region | 122 |
| Deflection unit | D |
| Light-emitting surface | a |
| Relay lens | b |
| Driving unit | 123 |
| Collecting lens | 131 |
| Relay lens | 132, 432 |
| Power control device | 140 |
| Light combining device | 170, 270, 470 |
| Projection lens | 180, 280 |
| Preset position | 191, 491 |
| Projection imaging plane | 192 |
| Polarizing element | 233, 433 |
| Reflective element | 434 |
| First dichroic mirror | 361a |
| Second dichroic mirror | 361b |
| First reflector | 362a |
| Second reflector | 362b |
| Third reflector | 362c |
| First liquid crystal panel | 363a |
| Second liquid crystal panel | 633b |
| Third liquid crystal panel | 363c |
| Light combining prism | 364 |

The present disclosure will be further illustrated by the following specific embodiments in conjunction with the above accompanying drawings.

DETAILED DESCRIPTION

In order to understand the above objections, features and advantages of the present disclosure more clearly, the present disclosure will be described in detail below with reference to the accompanying drawings and specific embodiments. It should be noted that the embodiments of the present disclosure and the features thereof may be combined with each other without confliction.

In the following description, many specific details are set forth in order to provide a thorough understanding of the present disclosure. The embodiments described below are merely some of, rather than all of, the embodiments of the present disclosure. In view of the embodiments of the present disclosure, all other embodiments made by those skilled in the art without any creative efforts shall fall within the scope of the present disclosure.

All technical and scientific terms configured herein have the same meaning as commonly understood by those skilled in the art, unless otherwise stated. The terms used in the description of the present disclosure are merely for the purpose of describing the specific embodiments, but are not intended to limit the present disclosure.

The present disclosure provides a wavelength conversion apparatus, a light source system including the wavelength conversion apparatus, and a display device including the light source system. The wavelength conversion apparatus and the light source system according to the present disclosure are suitable for commercial education projectors, miniature laser projectors, cinema projectors and other projection equipment. It should be understood that the wavelength conversion apparatus according to the present disclosure and the light source system including the wavelength conversion apparatus may also be applicable to other types of display devices such as laser televisions. That is, the display device may be a variety of types of display devices such as the commercial education projectors, the miniature laser projectors, the cinema projectors or the laser televisions.

The display device according to the present disclosure can superimpose two images to obtain a display image. The two images includes a scanned image generated by an angle deflection region on the wavelength conversion apparatus and a modulated image obtained by a light modulation device of the display device. The display device can superimpose the scanned image and the modulated image to form the display image for a user to view, which is beneficial to improve display brightness of the display device and can realize high-brightness and high-definition display with a small increase in cost.

Figure 1:
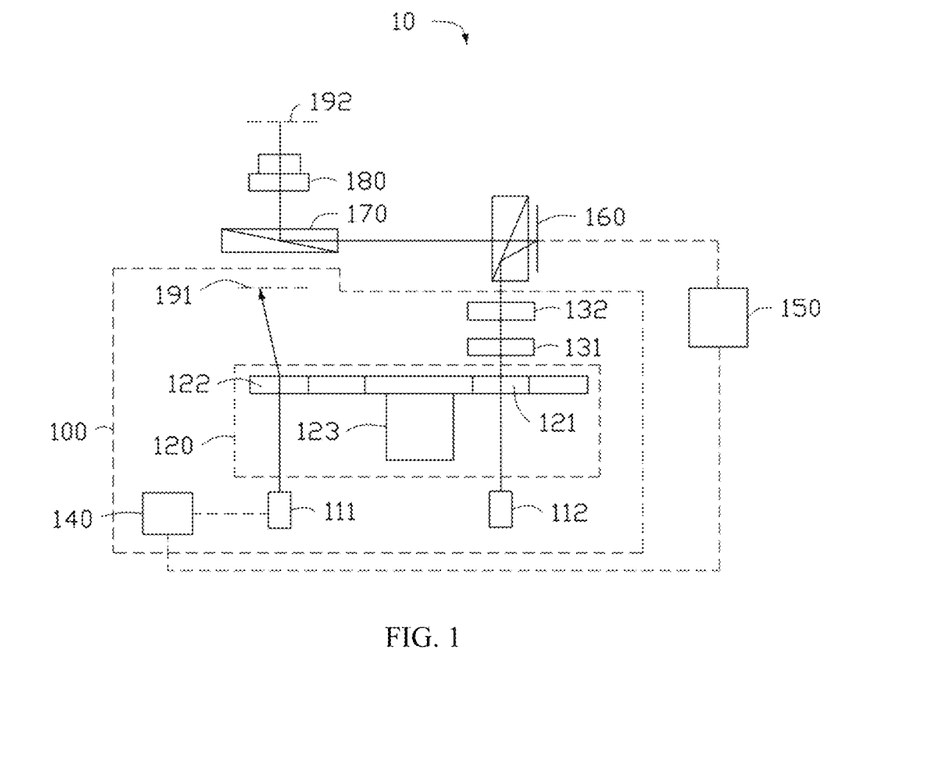
FIG. 1 is a schematic diagram of a display device according to a first embodiment of the present disclosure.

Referring to FIG. 1, a display device 10 includes a light source system 100, a light modulation device 160 and a control device 150. The control device 150 is configured to transmit a light modulation signal. The light source system 100 is configured to emit excited light and to form a scanned image at a preset position 191. The light modulation device 160 is configured to modulate light emitted by the light source system 100 based on the light modulation signal to generate modulated light and form a modulated image. The scanned image emitted from the preset position 191 and the modulated image are superimposed and then emitted from the display device 10 to form a display image on a surface of the display device 10 or a projection imaging plane 192 external to the display device 10.

Specifically, the light source system 100 includes a first light source 111, a second light source 112 and a wavelength conversion apparatus 120. The first light source 111 is configured to emit laser light as a first light, and the second light source 112 is configured to emit a second light. The wavelength conversion apparatus 120 includes a wavelength conversion region 121 and an angle deflection region 122. The angle deflection region 122 is configured to change a deflection angle of the first light, so that the emitted first light is sequentially projected onto different regions of the preset position 191. The wavelength conversion region 121 is configured to convert the second light to an excited light of at least one color.

Further, the first light source 111 is configured to emit the laser light as the first light. The first light source 111 is a laser light source and includes at least one luminous body. In this embodiment, the first light source 111 can have 1 to 10 luminous bodies, and the specific number of the luminous bodies can be selected as desired. The first light source 111 includes luminous bodies of three colors which can emit a first red light, a first green light and a first blue light. In other embodiments, the number of the luminous bodies is not limited to 10. The first light source 111 can emit a light of one color, or can emit light of two or more colors. The second light source 112 is configured to emit the second light. In this embodiment, the second light source 112 is a blue laser light source. The second light emitted by the second light source 112 has a polarization state different from that of the first light emitted by the first light source 111. In other embodiments, other types of light sources can also be used, such as arc lamps, light emitting diodes (LEDs), fluorescent light sources, and the like. In other embodiments, a color of the second light source 112 can be white, green, red, purple, or other colors.

The wavelength conversion apparatus 120 includes the wavelength conversion region 121, the angle deflection region 122 and a driving unit 123. The wavelength conversion region 121 is configured to convert the incident second light to the excited light to be emitted. The angle deflection region 122 is configured to change an emergent angle of the first light in time sequence, so that the emitted first light is capable of being projected to different regions of the preset position 191 to obtain the scanned image. In this embodiment, the driving unit is configured to drive the wavelength conversion apparatus 120 to move synchronously in time sequence. In an embodiment, the wavelength conversion region 121 and the angle deflection region 122 are located on a same wavelength conversion apparatus. In this case, when the wavelength conversion apparatus 120 is driven by the driving unit, the wavelength conversion region 121 and the angle deflection region 122 move synchronously. In another embodiment, the wavelength conversion region 121 and the angle deflection region 122 are located on different wavelength conversion apparatuses 120, and the driving unit of the control device 150 drives the wavelength conversion apparatus 120 where the wavelength conversion region 121 is located and the angle deflection region 122 to move synchronously. For example, the control device 150 controls the angle deflection region 122, so that the angle deflection region 122 is completely illuminated by the first light 122 in one movement cycle (one image frame), and all the fluorescent regions of the wavelength conversion region 121 are sequentially illuminated by the second light in this movement cycle. In this embodiment, the wavelength conversion apparatus is a color wheel.

Figure 2:
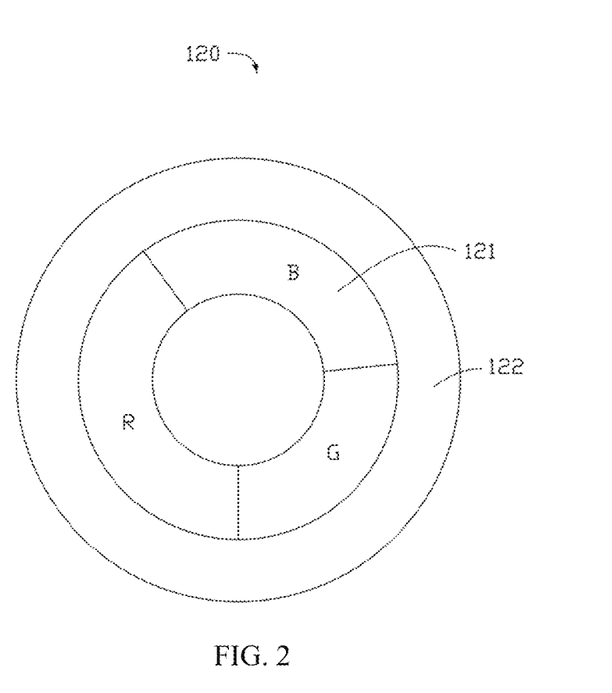
FIG. 2 is a three-dimensional view of a wavelength conversion apparatus shown in FIG. 1.

In this embodiment, the wavelength conversion region 121 is configured to transmit the second light. In this case, an incident direction of the second light is the same as an emergent direction of the excited light generated by the wavelength conversion region 121. The wavelength conversion region 121 includes a plurality of fluorescent regions, each of which is configured to convert the second light to an excited light of one color. Referring to FIG. 2, in this embodiment, the angle deflection region 122 and the wavelength conversion region 121 each have an annular shape and are adjacent to each other in and have a same rotation center. The plurality of fluorescent regions on the wavelength conversion region 121 include a red fluorescent region R and a green fluorescent region G. The red fluorescent region R and the green fluorescent region G are coated with wavelength conversion materials for generating red excited light and green excited light, respectively, which can convert the second light to the red excited light and the green excited light that diverge at a large angle. In this embodiment, the wavelength conversion region 121 further includes a scattering region B to transmit and scatter the blue second light. The red excited light, the green excited light and the blue laser light are emitted by the light source system 100 and are incident to the light modulation device 160. In another embodiment, the wavelength conversion region 121 can also be configured to reflect the second light. In this case, the incident direction of the second light is opposite to the emergent direction of the excited light generated by the wavelength conversion region 121.

In an embodiment, the wavelength conversion region 121 can include a yellow fluorescent region and a scattering region. In another embodiment, the wavelength conversion region 121 can be not partitioned. In this case, the wavelength conversion region can include a yellow fluorescent area for exciting yellow excited light, and the yellow fluorescent region can be configured to transmit or reflect the blue light emitted by the second light source 112. The yellow excited light and the blue light are irradiated onto the light modulation device 160 for modulation after being emitted from the light source system 100.

Figure 3:
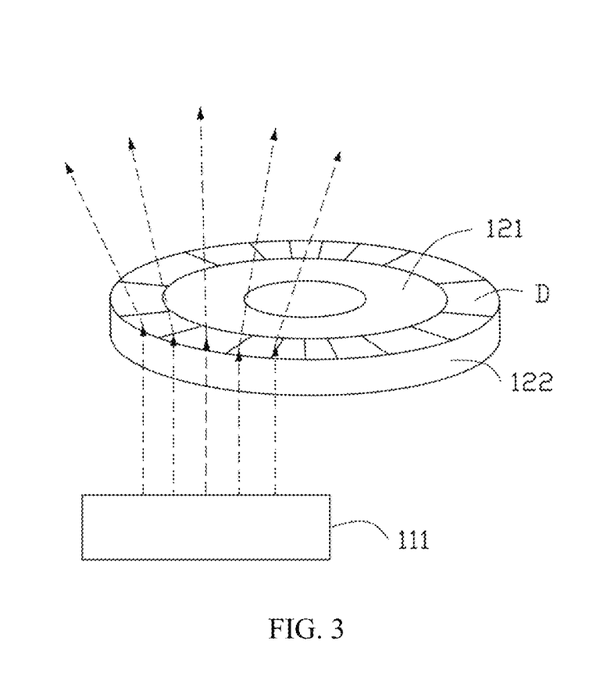
FIG. 3 is a schematic top view of the wavelength conversion apparatus shown in FIG. 2.

Referring to FIG. 3, the angle deflection region 122 includes deflection units D configured to transmit or reflect the first light. The deflection units D are sequentially located on an optical path of the incident first light to change an emergent angle of the first light sequentially, so that the first light emitted from at least two deflection units D sequentially scans at different positions of the preset position 191 to obtain the scanned image. Each of the deflection units D is configured to transmit or reflect a beam of the first light to sequentially change an emergent angle of each beam of the first light.

Figure 4:
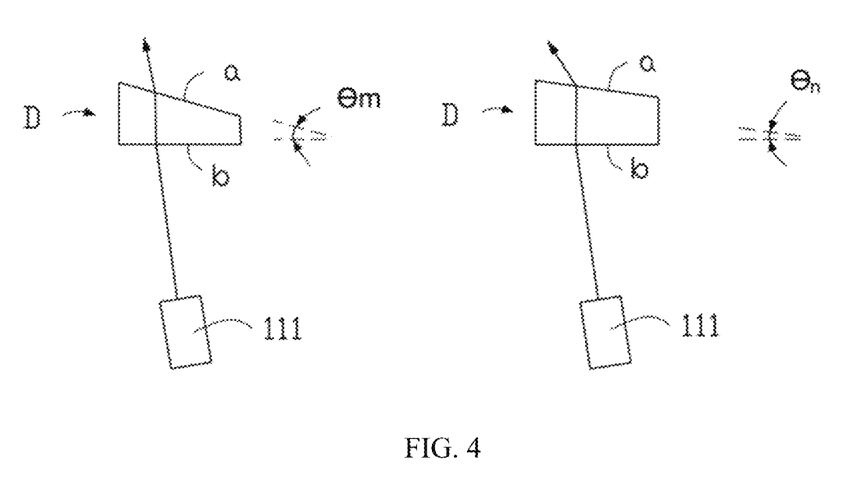
FIG. 4 is a schematic view of a light guiding of an angle deflection region in the wavelength conversion apparatus shown in FIG. 2 according to another embodiment of the present disclosure.
Figure 5:
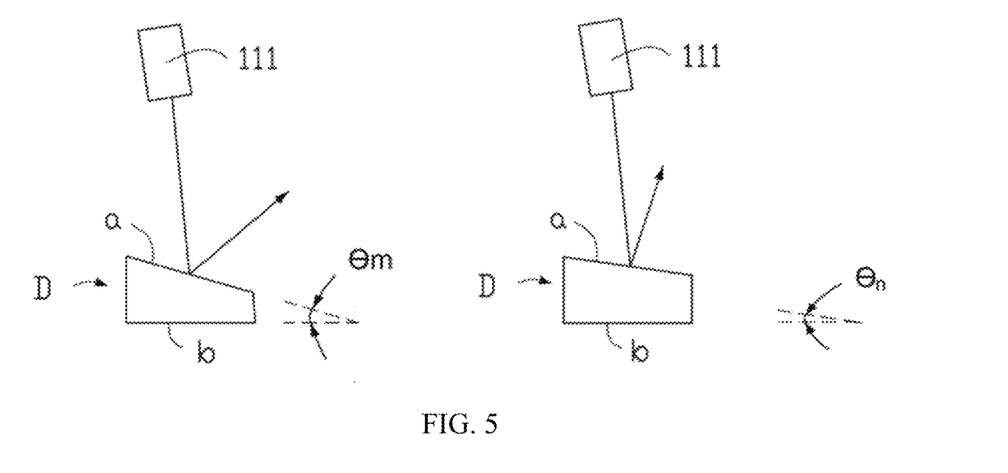
FIG. 5 is a schematic view of a light guiding of an angle deflection region in the wavelength conversion apparatus shown in FIG. 2.

Referring to FIGS. 4 and 5, each of the deflection units D includes a light-emitting surface, which is indicated by a, for emitting the first light, and a first included angle is formed between the light-emitting surface a and a reference plane, which is indicated by b. The first included angles formed between the reference plane b and the respective light-emitting surfaces of at least two of the plurality of deflection units D are not equal to each other. The reference plane b can be a horizontal plane or a plane in which the wavelength conversion region 121 resides. In this embodiment, the reference plane b of different deflection units D is a plane in which the wavelength conversion region 121 resides. In other words, the first included angles are formed between the different deflection units D and a turntable of the wavelength conversion apparatus 120. In this embodiment, the first included angles formed between the light-emitting surfaces a of different deflection units D in each section of each angle deflection region 122 and the reference plane b are not equal to each other.

Referring to FIG. 4, in this embodiment, the angle deflection region 122 is a transmissive angle deflection region. The multiple deflection units are numbered in order to distinguish the different deflection units D. When the first light emitted by the first light source 111 is incident to and refracted by the deflection unit D numbered m in the angle deflection region 122, the first included angle is correspondingly defined as $\theta_m$, and the emergent angle of the first light is defined as $\alpha_m$. When the first light is incident to and refracted by the deflection unit numbered n in the angle deflection region 122, the first included angle is defined as $\theta_n$, and the emergent angle of the first light is defined as $\alpha_n$.

When $θ_m$ is not equal to $θ_n$, $α_m$ is not equal to $α_n$, and the first light is incident to different regions of the preset position 191. In this embodiment, the light-emitting surface of the angle deflection region 122 is inclined toward a rotation axis of the wavelength conversion apparatus 120. As the wavelength conversion apparatus 120 rotates, the first included angle of the deflection unit D to which the first light is incident is continuously changed, so that the emergent first light is sequentially projected onto the different regions of the preset position 191.

In another embodiment, the angle deflection region is a reflective angle deflection region. Referring to FIG. 5, a difference between the reflective angle deflection region and the transmissive reflective deflection region is that the first light emitted by the first light source 111 is incident to the deflection unit D of the angle deflection region 122 and reflected by the deflection unit D, and then emitted as the first light to form the scanned image.

Figure 6:
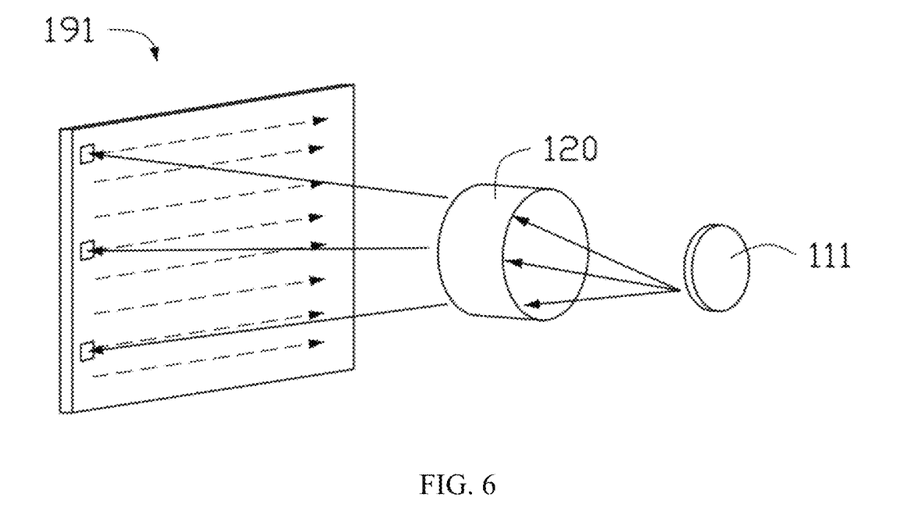
FIG. 6 is a schematic imaging view of forming a scanned image in the display device shown in FIG. 1.

Referring to FIG. 6, the deflection units D of the angle deflection region 122 are sequentially located on the optical path of the incident first light, so that the first light emitted from the at least two deflection units D sequentially scans different regions of the preset position 191 to form a plurality of virtual pixels arranged in an array. In this embodiment, the scanned image is used to form a low-resolution and low-frequency image. Specifically, a light spot projected by each beam of the first light at the preset position 191 corresponds to one virtual pixel. During each image frame, the first light emitted from at least one deflection unit D forms one virtual pixel at the preset position 191. A size of the virtual pixel is related to a size of the light spot of the first light and a scanning speed of the first light at the preset position 191.

The light modulation device 160 is configured to modulate the excited light based on the light modulation signal transmitted by the control device 150 and to emit the modulated light to form the modulated image. In this embodiment, the light modulation device 160 is a digital micromirror element. The modulated image and the scanned image are superimposed at a light combining device 170, and then is emitted from the display device 10 onto a projection imaging plane 192 to form a display image. One virtual pixel of the scanned image covers a plurality of projection pixels. In this embodiment, the light combining device 170 is a total internal reflection (TIR) prism.

The light modulation device 160 can display a high-resolution image. However, due to the limitation of heat dissipation and the reliability of components, the light modulation device 160 can withstand limited optical power, which limits brightness of the image. For example, 0.37" liquid crystal on silicon can generally have the number of lumens in the order of hundreds of lm. Since the scanned image can be formed without corresponding light modulation device, the brightness of the scanned image is not theoretically limited, the brightness of the scanned image formed at the preset position is much greater than that of the modulated image emitted by the light modulation device 160. In the present disclosure, the scanned image and the modulated image are superimposed to restore the brightness and details of the displayed image, thereby greatly increasing the brightness of the image without increasing an area of the light modulation device.

The control device 150 is configured to emit a light modulation signal. The light modulation device 160 modulates the excited light emitted from the wavelength conversion apparatus 120 based on the light modulation signal to form the modulated image. In an embodiment, the control device 150 is further configured to transmit a power adjustment signal based on original image brightness data of each pixel unit of an image to be displayed, and the power adjustment signal is used to adjust a driving current when the first light source 111 is incident to the corresponding deflection unit D. The first light source 111 is configured to emit the first light based on the power adjustment signal.

By designing the optical path, a deviation angle of the first light from the preset position 191 can be smaller than a light receiving angle of a projection lens 180, so that the scanned image and the modulated image are completely overlapped with each other on the projection imaging plane 192. In addition, the light source system 100 according to some embodiments of the present disclosure can also include guiding elements that are known by those skilled in the art, such as a collecting lens 131, a relay lens 132, etc.

Figure 7:
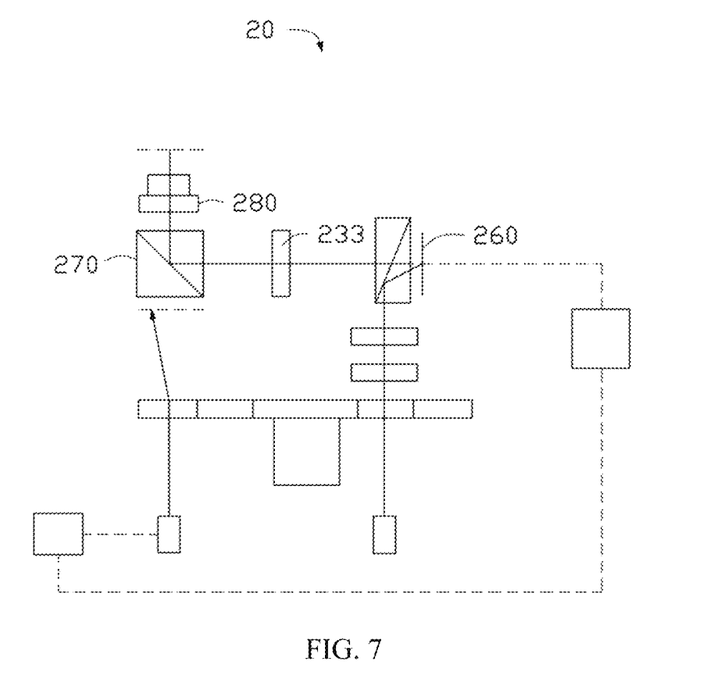
FIG. 7 is a schematic diagram of a display device according to a second embodiment of the present disclosure.

Referring to FIG. 7, in a second embodiment of the present disclosure, a main difference between the display device 20 and the display device 10 is that the first light emitted by the first light source 111 has a same polarization state as the second light emitted by the second light source 112. A polarizing element 233 is provided between a light modulating device 260 and a light combining device 270 and is configured to convert the polarization state of light. Modulated light emitted from the light modulation device 260 is polarized into a polarized light by the polarizing element 233, and the polarized light is incident to the light combining device 270, and then is emitted from a projection lens 280 after combined with the first light emitted from a preset position 216.

Figure 8:
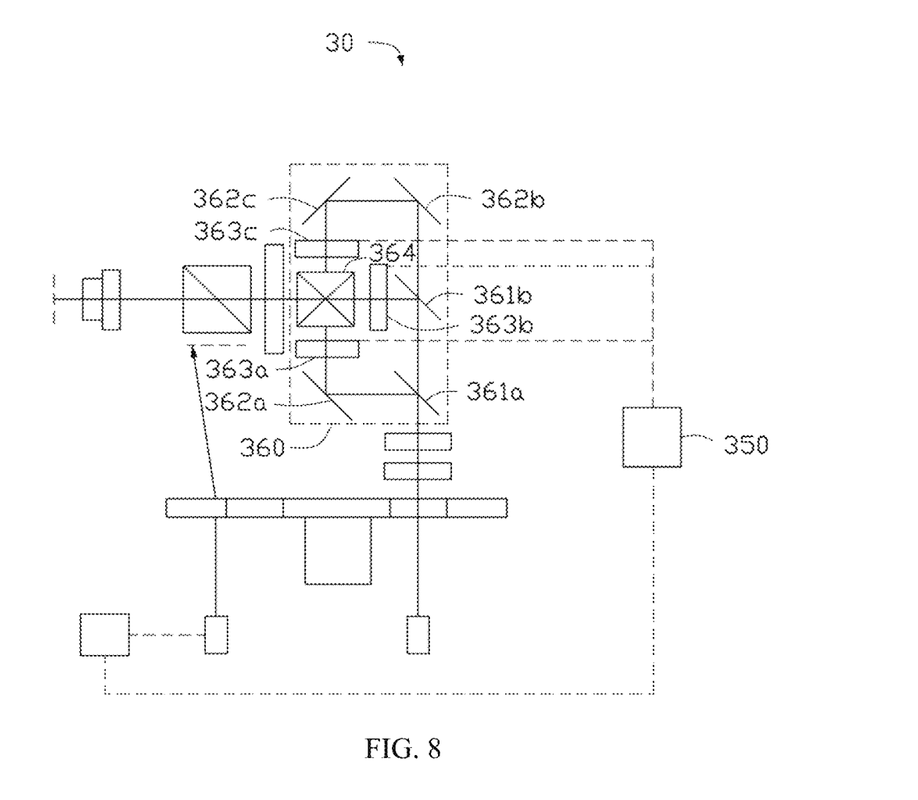
FIG. 8 is a schematic diagram of a display device according to a third embodiment of the present disclosure.

Referring to FIG. 8, in a third embodiment of the present disclosure, the main difference between the display device 30 and the display device 20 is that the light modulation device 360 is a three-piece liquid crystal panel and includes a first dichroic mirror 361a, a second dichroic mirror 361b, a first reflector 362a, a second reflector 362b, a third reflector 362c, a first liquid crystal panel 363a, a second liquid crystal panel 363b, a third liquid crystal panel 363c and a light combining prism 364.

In this embodiment, the excited light emitted from a relay lens is separated into blue light and yellow light by the first dichroic mirror 361a. The blue light is guided by the first reflecting mirror 362a to be projected onto the first liquid crystal panel 363a. The yellow light is separated into green light and red light by the second dichroic mirror 361b. The green light is projected onto the second liquid crystal panel 363b, and the red light is guided by the second mirror 362b and the third mirror 362c to be projected onto the third liquid crystal panel 363c. The blue light, the green light and the red light are combined by the light combining prism 364 after the light intensity modulation are performed on the blue light, the green light and the red light by the first liquid crystal panel 363a, the second liquid crystal panel 363b and the third liquid crystal panel 363c, respectively, and then are emitted therefrom to produce the modulated image with different gray levels and colors.

Specifically, the control device 350 transmits the light modulation signals to the first liquid crystal panel 363a, the second liquid crystal panel 363b, and the third liquid crystal panel 363c to change light transmittance of the blue light, the green light, and the red light when passing through the first liquid crystal panel 363a, the second liquid crystal panel 363a and the second liquid crystal panel 363c, respectively, so as to modulate the light intensity of the blue light, the green light and the red light incident to the light combining prism 364.

Figure 9:
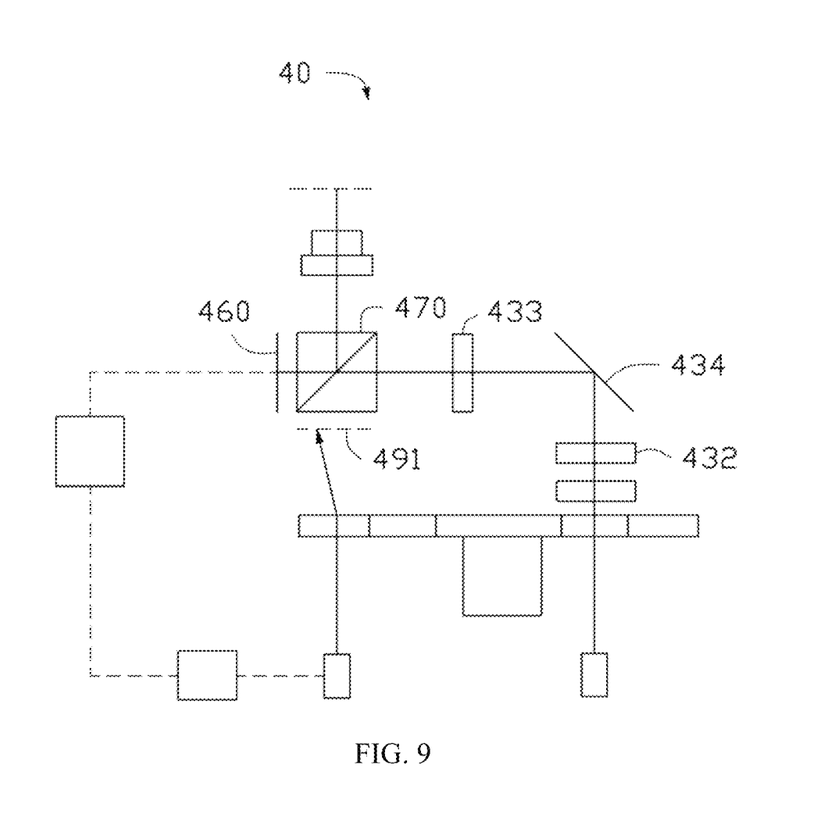
FIG. 9 is a schematic diagram of a display device according to a fourth embodiment of the present disclosure.
Figure 10A:
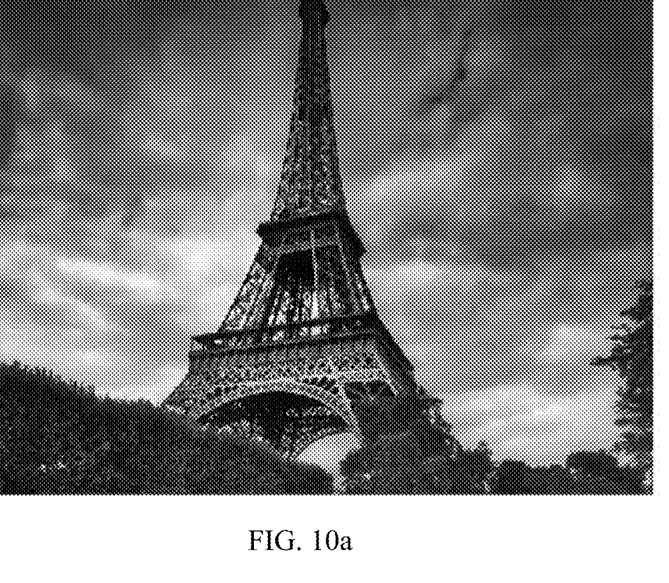
FIG. 10a is a frame of image to be displayed.
Figure 10B:
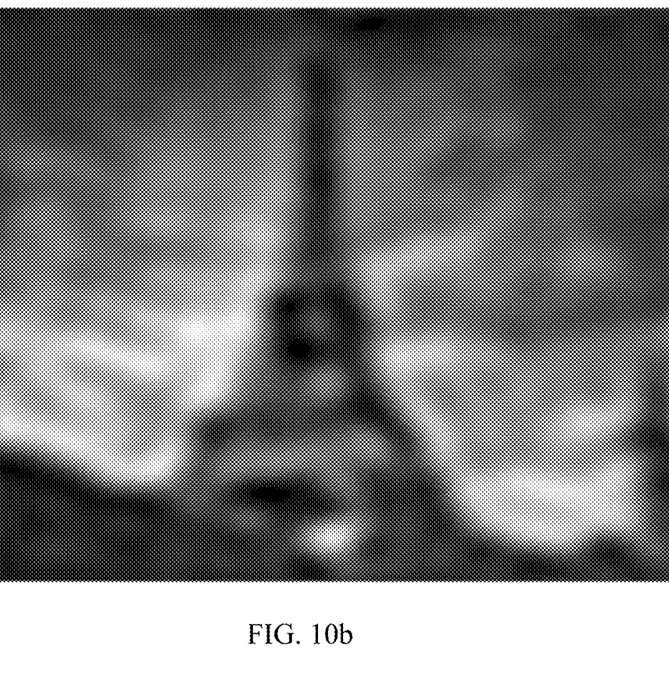
FIG. 10b is a scanned image obtained by the display device shown in FIG. 10a according to the present disclosure.
Figure 10C:
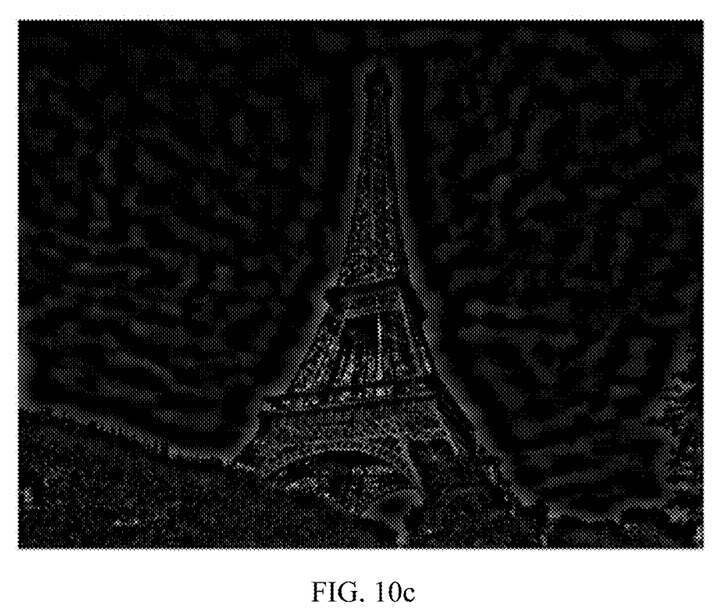
FIG. 10c is a modulated image obtained by the display device shown in FIG. 10a according to the present disclosure.
Figure 10D:
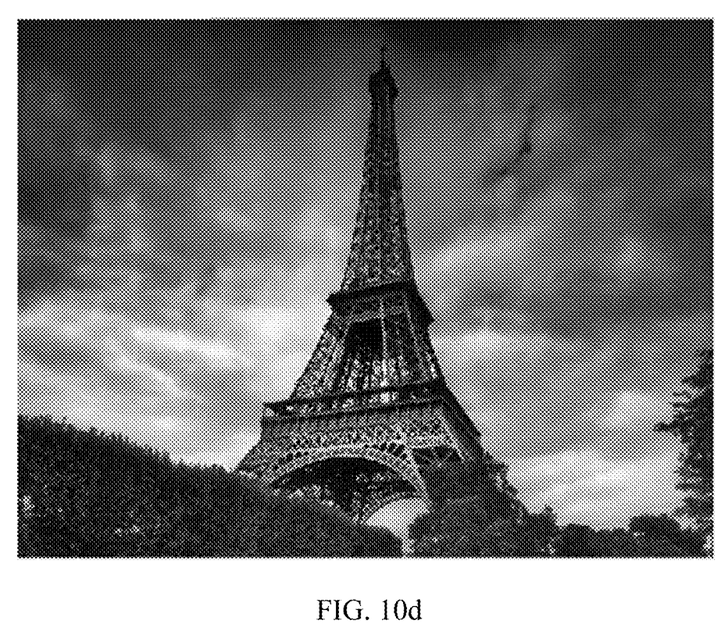
FIG. 10d is a display image obtained by superimposing the scanned image shown in FIG. 11 and the modulated image shown in FIG. 10c.
Figure 10E:
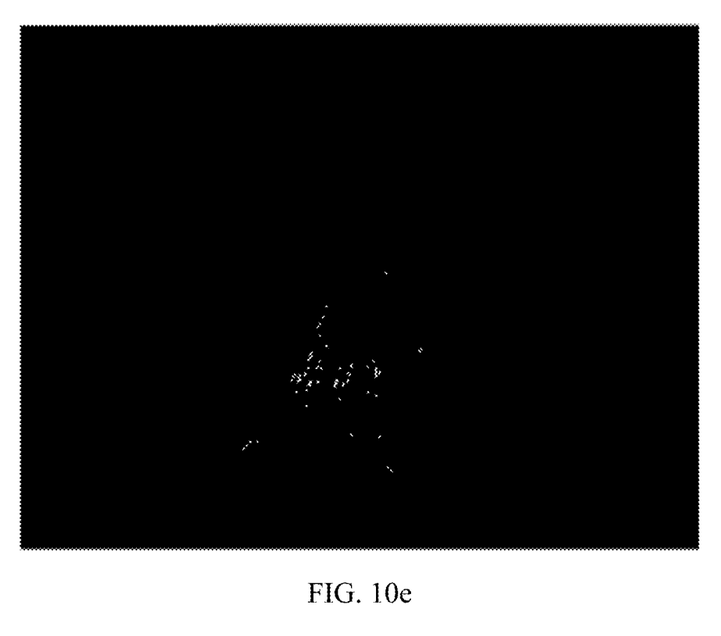
FIG. 10e shows a difference between the image to be displayed shown in FIG. 10a and the displayed image shown in FIG. 10d.

Referring to FIG. 9, a main difference between a display device 40 and the display device 20 is that the excited light emitted from a relay lens 432 is guided by a reflective element 434 to be incident to a polarizing element 433, and the polarized light emitted from the polarizing element 433 is incident to the light modulation device 460 to be modulated, and the modulated light emitted from the light modulation device 460 is combined with the first light at the preset position 491 by the light combining device 470 and then is emitted from the light combining device 470. In this embodiment, the light modulation device 460 is a liquid crystal on silicon spatial light modulator.

Noted that, the specific technical solutions of the display devices in the various embodiments is mutually applicable within the spirit scope or essential features of the present disclosure, and the detailed description thereof not repeated herein for the sake of brevity.

In order to better understand the actual effect of the present disclosure, as shown in FIGS. 10a to 10e, the brightness of the output image of the display device according to the present disclosure is at least twice as high as the brightness of the output image of the light modulation device. For the projection system that is limited by the maximum output brightness of the light modulation device, the display device according to the present disclosure can greatly increase peak brightness of the output image of the display device, which depends on the maximum tolerable light intensity of the light modulation device and the peak light intensity of the first light source as well as the number of luminous bodies contained in the first light source.

The wavelength conversion apparatus and the light source system according to the present disclosure, on the one hand, use the angle deflection region to adjust the emergent direction of the emitted light to form the scanned image, and on the other hand, use the wavelength conversion region to generate the excited light to be applied to the display of the color image. The display device according to the present disclosure is configured to superimpose the scanned image and the modulated image obtained by modulating the excited light through the light modulation device, which is beneficial to improve the display brightness of the display device without increasing the resolution of the light modulation device, and can avoid the volume and cost of display device from being increased due to the increased resolution of the light modulation device.

It is apparent for those skilled in the art that the present disclosure is not limited to the details of the foregoing exemplary embodiments, and can be implemented in other specific forms without departing from the spirit or essential features of the present disclosure. Therefore, from any point of view, the embodiments should be regarded as exemplary and non-limiting. The scope of the present disclosure is defined by the appended claims, rather than the above description. Therefore, it is intended for all changes falling within the meaning and scope of the equivalent elements of the claims to be included in the present disclosure. Any reference signs in the claims should not be regarded as limiting the involved claims. In addition, it is obvious that the word "including" or "comprising" does not exclude other units or steps, and the singular does not exclude the plural. The plurality of devices stated in the device claims may also be implemented by the same device or system through software or hardware. Words such as first and second are used to denote names, rather than any specific order.

Finally, it should be noted that the above embodiments are merely configured to illustrate the technical solutions of the present disclosure and not to limit the present disclosure. Although the present disclosure has been described in detail with reference to some embodiments, it should be understood by those skilled in the art that modifications or equivalent replacements can be made to the technical solutions of the present disclosure without departing from the spirit and scope thereof.

The invention claimed is:

1. A wavelength conversion apparatus, comprising:
an angle deflection region configured to receive a first light from a first light source to achieve angle deflection of the first light, wherein the angle deflection region comprises a plurality of deflection units, wherein each of the plurality of deflection units comprises a light-emitting surface for emitting the first light, wherein a first included angle is formed between the light-emitting surface and a reference plane, and first included angles formed between the reference plane and light-emitting surfaces of at least two of the plurality of deflection units are not equal to each other, and wherein the plurality of deflection units are located on an optical path of the first light in time sequence in order to change an emergent angle of the first light in time sequence in such a manner that the first light is successively scanned at a preset position to form a plurality of virtual pixels; and
a wavelength conversion region configured to receive a second light from a second light source, convert the second light incident thereto into an excited light and emit the excited light to achieve wavelength conversion of the second light.

2. The wavelength conversion apparatus according to claim 1, wherein the reference plane is a horizontal plane or a plane in which the wavelength conversion region resides.

3. The wavelength conversion apparatus according to claim 1, wherein the wavelength conversion region comprises at least one fluorescent region, which is sequentially located on an optical path of the second light and is excited to generate the excited light during one image frame, and wherein the first light emitted from at least one of the plurality of deflection units is projected onto the preset position to form one of the plurality of virtual pixels.

4. The wavelength conversion apparatus according to claim 1, wherein the wavelength conversion apparatus is a color wheel and further comprises a driving unit configured to drive the wavelength conversion apparatus to move in time sequence.

5. The wavelength conversion apparatus according to claim 4, wherein the light-emitting surfaces of the angle deflection region are inclined toward a rotation axis of the wavelength conversion apparatus.

6. The wavelength conversion apparatus according to claim 2, wherein the wavelength conversion region comprises at least one fluorescent region, which is sequentially located on an optical path of the second light and is excited to generate the excited light during one image frame, and wherein the first light emitted from at least one of the plurality of deflection units is projected onto the preset position to form one of the plurality of virtual pixels.

7. The wavelength conversion apparatus according to claim 2, wherein the wavelength conversion apparatus is a color wheel and further comprises a driving unit configured to drive the wavelength conversion apparatus to move in time sequence.

8. A light source system, comprising:
a first light source configured to emit laser light as a first light;

a second light source configured to emit a second light; and a wavelength conversion apparatus, wherein the wavelength conversion apparatus comprises an angle deflection region and a wavelength conversion region, wherein the angle deflection region is configured to receive the first light from the first light source to achieve angle deflection of the first light, wherein the angle deflection region comprises a plurality of deflection units, wherein each of the plurality of deflection units comprises a light-emitting surface for emitting the first light, wherein a first included angle is formed between the light-emitting surface and a reference plane, and first included angles formed between the reference plane and light-emitting surfaces of at least two of the plurality of deflection units are not equal to each other, and wherein the plurality of deflection units are located on an optical path of the first light in time sequence in order to change an emergent angle of the first light in time sequence in such a manner that the first light is successively scanned at a preset position to form a plurality of virtual pixels; and the wavelength conversion region is configured to receive the second light from the second light source, convert the second light incident thereto into an excited light, and emit the excited light to achieve wavelength conversion of the second light.

9. The light source system according to claim 8, further comprising:
a power control device configured to adjust a driving current of the first light source based on original image data.

10. The light source system according to claim 8, wherein the reference plane is a horizontal plane or a plane in which the wavelength conversion region resides.

11. The light source system according to claim 8, wherein the wavelength conversion region comprises at least one fluorescent region, which is sequentially located on an optical path of the second light and is excited to generate the excited light during one image frame, and wherein the first light emitted from at least one of the plurality of deflection units is projected onto the preset position to form one of the plurality of virtual pixels.

12. The light source system according to claim 8, wherein the wavelength conversion apparatus is a color wheel and further comprises a driving unit configured to drive the wavelength conversion apparatus to move in time sequence.

13. The light source system according to claim 12, wherein the light-emitting surfaces of the angle deflection region are inclined toward a rotation axis of the wavelength conversion apparatus.

14. A display device, configured to emit image light to a projection imaging plane based on original image data of each frame of images to be displayed to form a display image, the images to be displayed comprising a plurality of pixel units, and the display device comprising:

a control device configured to transmit a light modulation signal based on the images to be displayed;

a light source system, wherein the light source system comprises a wavelength conversion apparatus, a first light source, and a second light source, wherein the first light source is configured to emit laser light as a first light, and the second light source is configured to emit a second light, and wherein the wavelength conversion apparatus comprises an angle deflection region and a wavelength conversion region, wherein the angle deflection region is configured to receive the first light from the first light source to achieve angle deflection of the first light, wherein the angle deflection region comprises a plurality of deflection units, wherein each of the plurality of deflection units comprises a light-emitting surface for emitting the first light, wherein a first included angle is formed between the light-emitting surface and a reference plane, and first included angles formed between the reference plane and light-emitting surfaces of at least two of the plurality of deflection units are not equal to each other, and wherein the plurality of deflection units are located on an optical path of the first light in time sequence in order to change an emergent angle of the first light in time sequence in such a manner that the first light is successively scanned at a preset position to form a plurality of virtual pixels; and the wavelength conversion region is configured to receive the second light from the second light source, convert the second light incident thereto into an excited light, and emit the excited light to achieve wavelength conversion of the second light; and a light modulation device configured to modulate the excited light based on the light modulation signal and then emit the modulated light to form a modulated image, wherein the modulated image is superimposed with a scanned image, and then is emitted from the display device onto the projection imaging plane, wherein the scanned image is formed by the first light passing through the angle deflection region, and wherein each of the plurality of virtual pixels of the scanned image covers a plurality of projection pixels.

15. The display device according to claim 14, wherein the control device is further configured to transmit a power adjustment signal based on original image brightness data of each of the plurality of pixel units of the images to be displayed, wherein the power adjustment signal is configured to adjust a driving current when the first light source is incident to at least one corresponding deflection unit of the plurality of deflection units, and wherein the first light source is configured to emit the first light based on the power adjustment signal.

16. The display device according to claim 14, wherein the light source system further comprises a power control device configured to adjust a driving current of the first light source based on original image data.

* * * * *